United States Patent [19]

Lencioni, Jr.

[11] 4,219,028

[45] Aug. 26, 1980

[54] AUTOMATIC VERIFYING ELECTROENCEPHALOGRAPH SYSTEM

[75] Inventor: Cecil C. Lencioni, Jr., Chicago, Ill.

[73] Assignee: Beckman Instruments, Inc., Fullerton, Calif.

[21] Appl. No.: 867,727

[22] Filed: Jan. 9, 1978

[51] Int. Cl.³ .............................................. A61B 5/04
[52] U.S. Cl. .............................. 128/731; 346/33 ME; 346/62
[58] Field of Search ............ 128/2.1 B, 2.1 R, 2.06 G, 128/2.06 R, 731, 732, 710–712; 346/33 ME, 23, 62

[56] References Cited

U.S. PATENT DOCUMENTS

| | | | |
|---|---|---|---|
| 3,185,925 | 5/1965 | Grass | 128/2.1 B |
| 3,200,404 | 8/1965 | Ott | 346/62 |
| 3,478,364 | 11/1967 | Frank | 346/62 |
| 3,922,686 | 11/1975 | France et al. | 128/2.06 G X |
| 4,037,586 | 7/1977 | Grichnik | 128/2.1 B |

FOREIGN PATENT DOCUMENTS 1170769  1/1959  France ............................ 128/2.06 R

OTHER PUBLICATIONS

Hard, "Alphanumeric . . . Recorders", Electromedica, No. 2, pp. 69–74, 1976.
Knott, "How to Get the Most Out of Your EEG Machine", Med-Surg. Review, 4th Quarter, 1969, pp. 16–19.
Grass Instruments, "Rec-Ident-EEG . . . System", Sep. 1976.
Medical Systems Corp., "Portable EEG . . . Use".

Primary Examiner—Lee S. Cohen
Attorney, Agent, or Firm—Robert J. Steinmeyer; Paul R. Harder

[57] ABSTRACT

An improved electroencephalograph system is disclosed having a system for automatically verifying the input and output parameters of the various channels, the preset number selected, and a patient identification number. A coded output is used employing the standard EEG pen recorder outputs. Numerical sequences such as the preset number and a patient identification number are displayed on a single event marker channel as modified Roman numeral sequence of digits directly readable by the operator.

14 Claims, 6 Drawing Figures

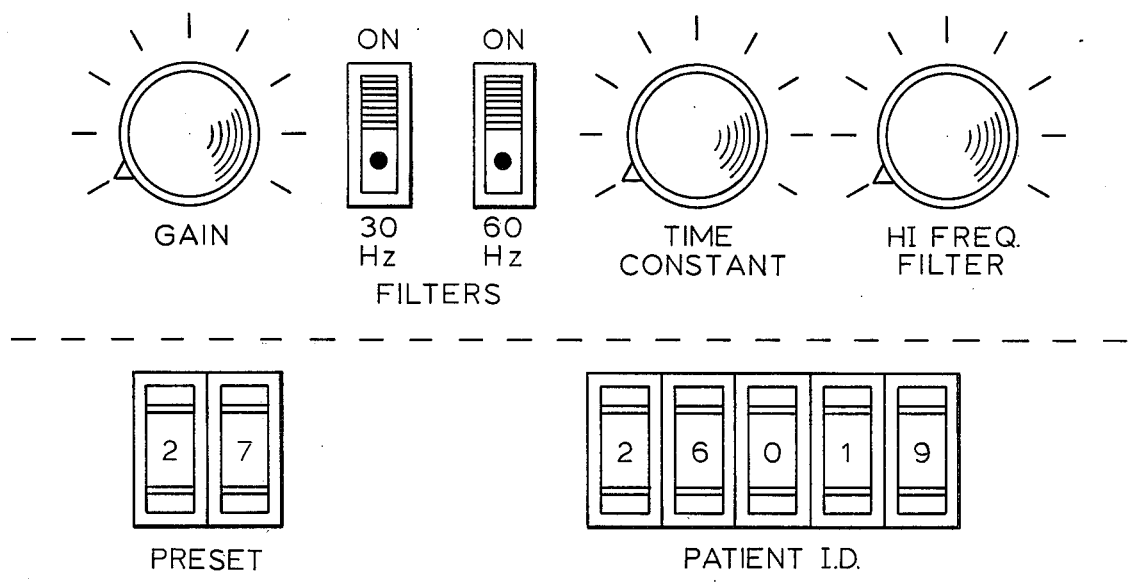
FIG 1
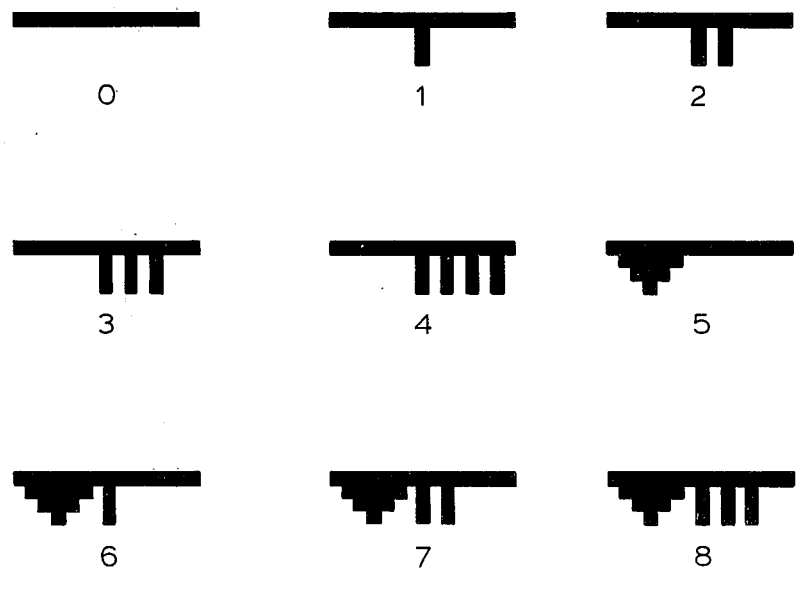
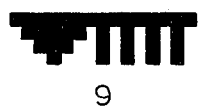
FIG 3

AUTOMATIC VERIFYING ELECTROENCEPHALOGRAPH SYSTEM

BACKGROUND OF THE INVENTION

The present invention relates to electroencephalographs and more particularly to accessory devices to be used in conjunction with an electroencephalograph to provide system parameter data to an operator thereof.

In a standard electroencephalograph (EEG) system, a plurality of electrodes are attached to a patient's scalp according to a given, well established, pattern. The signals emanating from the brain are detected by these electrodes and conducted to the EEG instrument where they are amplified and made available for display on a multiple pen recorder. The EEG instrument typically has a number of parameters which can be set by the operator to determine the amplification factors and display sequence on the recorder of the signals being sensed. For example, the electrodes can be assigned to particular channels, the gain of the individual channel amplifiers adjusted, and various filters and time constants inserted and set to exclude extraneous electrical impulses being sensed by the electrodes from such sources as electric lights, other equipment, etc. Also, the data gathered must be identified with the particular patient. Additionally, certain patterns associated with the electrodes chosen to be sampled and the placement of their signal on the recorded output are standard and, therefore, "preset" in many EEG instruments. That is, the operator merely sets a configuration number on a preset selection dial to cause a particular set of electrodes to be assigned to previously selected channels.

Since the interpretation of the recorded output is dependent upon all these input parameters, the operator must physically mark the parameter data upon the recorded output when it is changed. This, of course, is a time consuming task which is prone to error production through the mismarking of data or through inexact handwriting which is misread at a later date.

Attempts have been made by others to provide system parameter data to the operator through the recorded output. In one system, a pulse coding of spikes is provided on a dedicated event marker channel in response to specific inputs by the operator on a pushbutton keyboard. Such a system is, of course, not automatic and the output must be interpreted as to meaning. In yet another system, two back-to-back pens are dedicated and positioned so as to print actual letters and numerals. Such an approach can automatically provide limited information in a readable form but leaves much necessary data undisplayed. Further, an extra recording channel must be utilized in addition to the one usually provided for "event" marking. Moreover, a minor malfunction in the operation of one or both of the pens can result in an output which can vary from difficult to comprehend to completely unreadable.

Thus, it is an object of the present invention to provide an EEG instrument providing means for automatically including the aforementioned parameter data on the recorded output of the EEG in a simple manner which is instantly and constantly recognizable by the operator at a later time.

SUMMARY

The stated objective of the present invention has been met in the present invention by an EEG system having means to sense the various switch positions including an added multiposition switch through which the operator can indicate an identification number to be associated with the patient. The sensed parameters are then indicated using the standard output pens of the recorder associated with the EEG instrument by temporarily overriding the standard signal output for a period following the changing of an input parameter and at certain points in the operating sequence. In particular, the preset and patient ID numbers, comprising a sequence of digits 0-9, are displayed inline on a single event marker channel by a modified Roman numeral character set.

DESCRIPTION OF THE DRAWINGS

FIG. 1 is a simplified drawing of a portion of the control panel of a typical EEG system.

FIG. 2 depicts various output patterns possible on an EEG recorder in response to no signal, a typical brainwave signal, fixed d.c. signals and pulsed d.c. signals.

FIG. 3 shows the digits 0-9 in a modified Roman numeral character set as employed in the present invention.

FIG. 6 depicts two EEG recorder channel outputs when incorporating the channel data display teachings of the present invention.

DESCRIPTION OF THE PREFERRED EMBODIMENT

Figure 4:
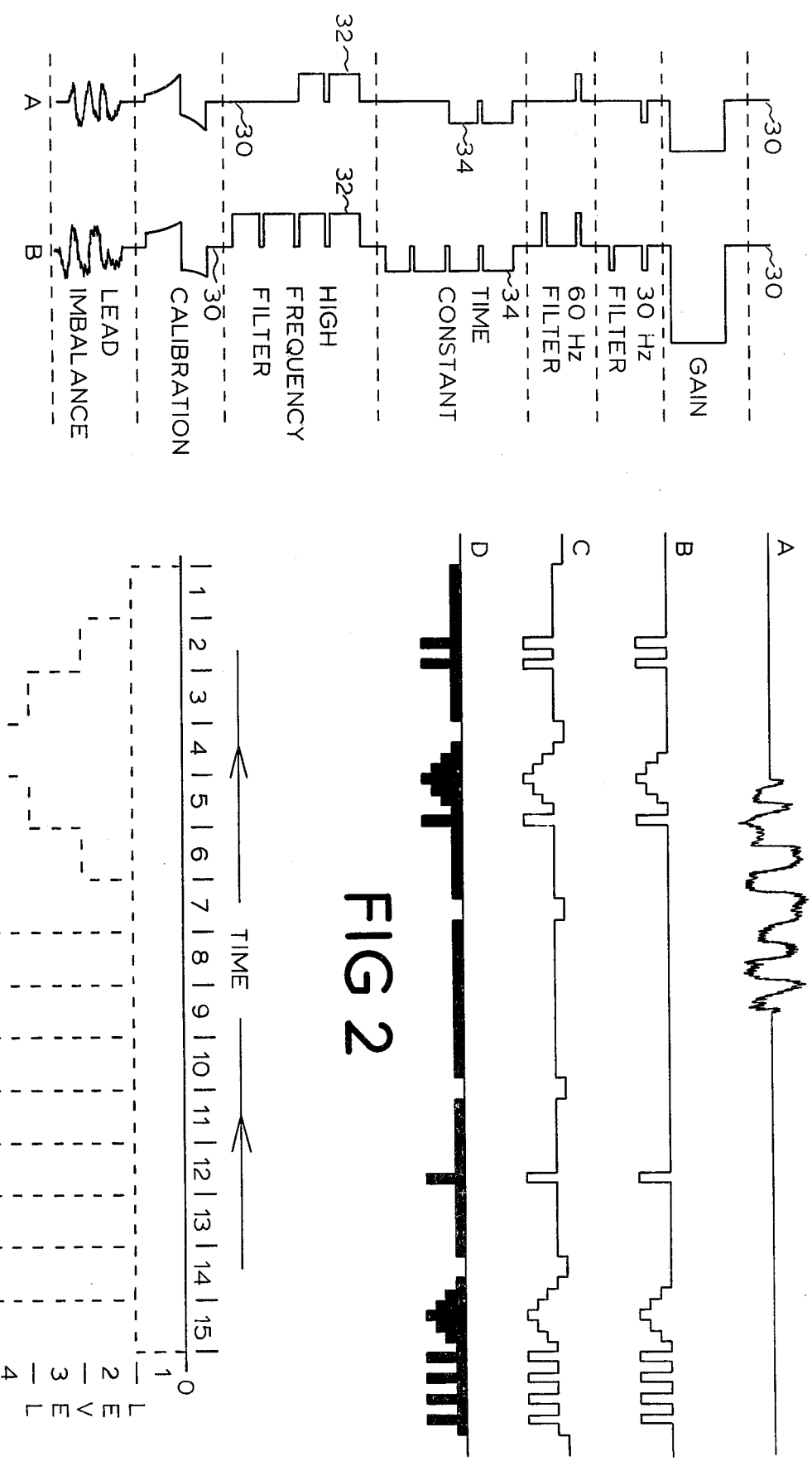
FIG. 4 is an enlarged view of the time durations and level designations relative to the 0 baseline of an EEG recorder output employed in the preferred embodiment of the present invention to create the character set of FIG. 5.

FIG. 1 depicts in simplified form some of the function control switches available on the control direct of a typical EEG instrument employing the present invention. The controls fall into two broad categories. First, those controls existing for the total instrument. Second, those controls which are duplicated for each channel. In the drawing of FIG. 1, those controls below the dotted line are for the entire instrument while those above the dotted line would be duplicated for each channel of the output recorder. Thus, each channel typically has control of such factors as gain, specific frequency filters, amplifier response time constant, and a high frequency filter. The EEG instrument itself typically has a switch whereby previously set "preset" configurations of electrode leads to output channel assignments can be selected such as the two digit "thumbwheel" type switch labeled "PRESET" in FIG. 1. In the preferred embodiment of the present invention, the additional five digit thumbwheel switch labeled "PATIENT I.D." is added to provide the operator with the ability to specify a patient identification number for each EEG run. Thus, if a particular patient is assigned the identification number 26019 as shown in FIG. 1, this number can be dialed into the "PATIENT I.D." thumbwheel switch each time that patient has an EEG taken. His identification number is then appended automatically to the recorded output in a manner to be hereinafter discussed in greater detail.

It is to be understood that the configuration of FIG. 1 is meant to be representative of the type of functional switches to be found on an EEG instrument only and neither depicts an actual instrument panel nor all the switches contained thereon.

With reference now to FIG. 2, the output of each channel of a typical recorder of an EEG appears similar to line A. When no signal is present, a straight line appears. When an amplified brainwave signal is connected to be output on the recorder channel, the signal is much like that shown modulating a portion of the otherwise straight line A of FIG. 2.

By applying a DC voltage of single polarity to the pen motor of the recorder, the straight line output can be deflected to one side of the center or "zero" line in discrete levels to cause an output such as that of line B of FIG. 2. As shown by the simulated output of line B, a single level short duration deflection can be accomplished so as to produce the equivalent of an "I". Similarly, by causing an ascending step function rise followed by a descending step function, the equivalent of a "V" can be produced on the output. The present invention incorporates a modified Roman numeral system employing these I's and V's. The specific codes will be set forth hereinafter.

The proposed coding system employed in the present invention could be implemented using a technique such as that depicted by line B of FIG. 2. The exact positioning of the I's and V's vis-a-vis the forming of specific digits is often not readily apparent from such a display, however. That is, the delineation between one numeral and the next is not set forth in a manner which prevents possible misinterpretation of the data. By providing a base level change lasting throughout and thus defining the duration of each digit, as shown in FIG. 2, line C, this problem is eliminated. In line C, it should be apparent that there are five digits of which the middle is zero. In the preferred embodiment, however, the improvement of line C over line B has been carried one step further as shown in simulated output D of FIG. 2. In line D, the individual characters are made as a bold face presentation for easier reading by the operator in a manner which will be described in greater detail hereinafter.

The specific character set employing the principle of line D of FIG. 2 is set forth in FIG. 3. Whereas, in normal Roman numerals, the characters employed are the I, V, and X (for numbers from 1-10) the present character set uses a digit base line having only the characters I and V imposed thereon in various combinations as shown in FIG. 3 to provide the numerals 0-9 required for conventional decimal notation. The base line with no superimposed characters provides the numeral 0. Numerals 1, 2, 3, 5, 6, 7, and 8 are identical with the conventional Roman numeral representations. Numeral 4 is replaced by four I's and numeral 9 is replaced by VIIII. Thus the character sequence is readily apparent to one familiar with Roman numeral notation without an elaborate decoding process as would be required with other complex notations which could be employed, e.g. binary. Referring once again to FIG. 2, it is apparent, therefore, that lines B, C, and D all represent the same patient I.D. number indicated on the console of FIG. 1, namely, 26019.

In the standard EEG recorder, the individual channel pen motors are fixed in spaced adjacent relationship across the recorder paper. The pens are deflected from side to side as the paper is drawn longitudinally slowly and continuously under the pens by a paper drive mechanism. This characteristic is used to advantage to generate the characters employed in the present invention as hereinbefore described by a technique which can be best understood with reference to FIG. 4. In FIG. 4, the base or zero line which would be followed by the pen in the absence of any deflection is labeled as "0". Each character position is divided into an optional fixed number of time increments. In the example shown, there are 15 time increments for each character to be displayed. Of course, time increments would have to be provided between each character. For purposes of discussion, however, we will only consider the time divisions defining the specific characters. The deflection of the pen away from the base line in one direction is segmented into levels which are labeled "LEVEL" in FIG. 4. In the example of FIG. 4, there are four levels. As with the time increments, the number of levels is a matter of choice. In embodiments of the present invention tested by the applicant herein, four levels has been found to provide a preferred number of levels to be employed.

If the pen motor is moved from one level to another and remains in the new position for one time period, an output pattern such as that of line B or C of FIG. 2 will be generated. If, on the other hand, the pen motor is oscillated or pulsed between the base line and the desired level during each time period, a darkened output pattern such as that of FIG. 2, line D will be generated. This is the technique employed in the preferred embodiment of the present invention.

As will be hereinafter discussed in greater detail, the present invention is employed in an EEG instrument having a microprocessor computer capability contained therein. Each character of the modified Roman numeral set is defined in a sequence of memory locations defining the level of oscillation for each time period of the time sequence used to generate a character. If 15 time periods and four levels are employed such as that of FIG. 4, 15 memory locations are employed to define a character and each memory location contains a value of 1, 2, 3, or 4. For example, the definition of the character 7 would appear as:

| Memory Location | Contents |
| --- | --- |
| 1 | 1 |
| 2 | 2 |
| 3 | 3 |
| 4 | 4 |
| 5 | 3 |
| 6 | 2 |
| 7 | 1 |
| 8 | 4 |
| 9 | 1 |
| 10 | 4 |
| 11 | 1 |
| 12 | 1 |
| 13 | 1 |
| 14 | 1 |
| 15 | 1 |

As can be verified with reference to FIG. 4 and FIG. 3, if the pen motor is oscillated between the base line and the indicated levels shown in the foregoing table, the desired "VII" riding on the base line and representing the numeral 7 in the manner of FIG. 3 will be produced. Since each character requires 15 memory locations for its definition, it is clear that 150 memory locations are required to define the required digits 0-9.

Figure 5:
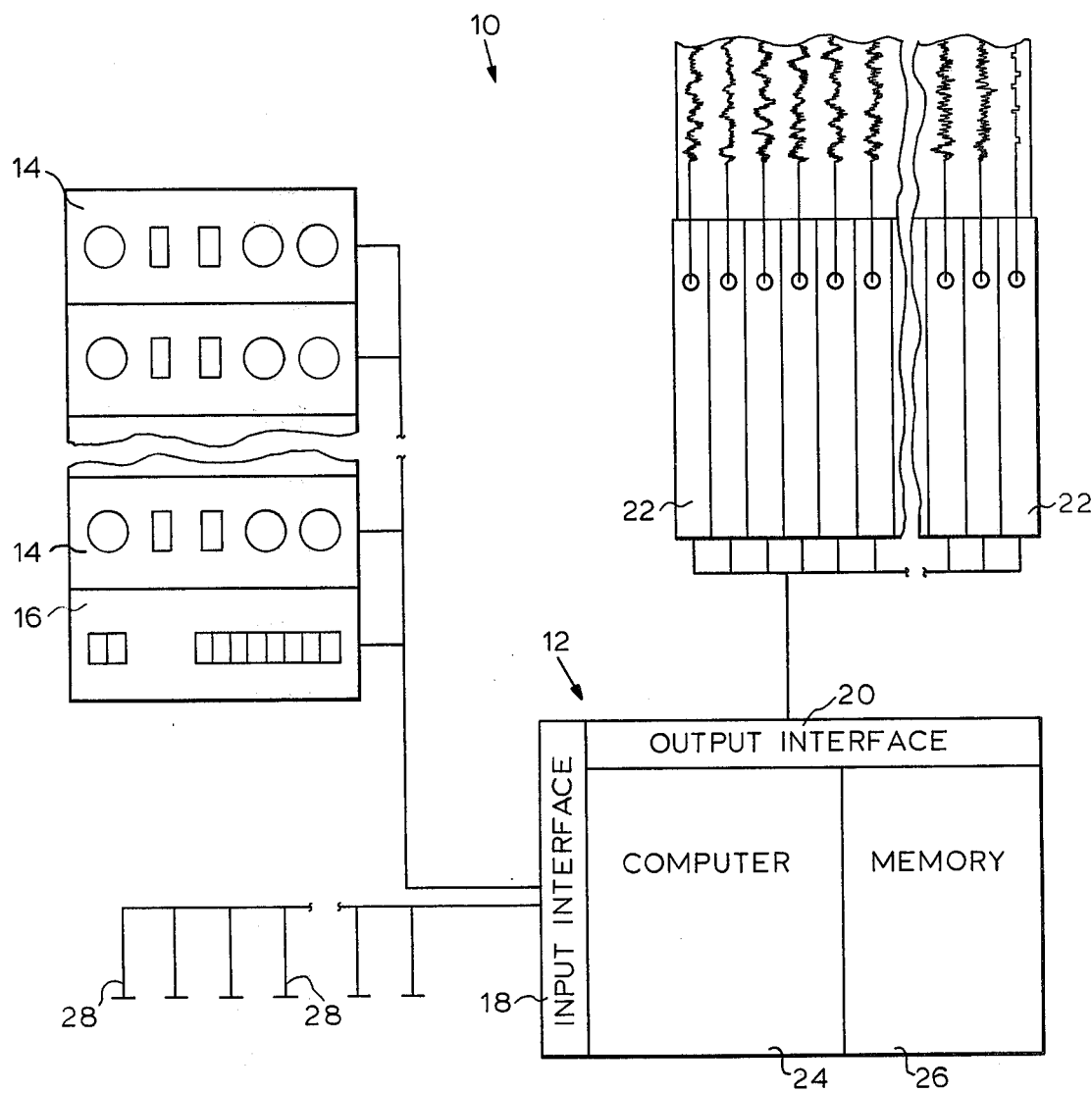
FIG. 5 is a simplified drawing of a multiplexed EEG instrument system employing a micro-computer as wherein the present invention is best incorporated.

A simplified diagam of an EEG system incorporating the present invention and being developed by the assignee of the present application is shown in FIG. 5. In such a system generally indicated as 10, the system is built around the computing capabilities of a microprocessor generally indicated as 12. The various channel control panels 14 and instrument control panel 16 are read by a multiplexing input interface 18. A multiplexed output interface 20 is connected to the pen motors 22. The portion indicated as computer 24 encompasses functions of logic, amplification, signal conditioning, and multiplexing through input interface 18 and output interface 20. Additionally, memory 26 is provided in communication with computer 24 and containing such items as the definitions of modified Roman numeral character sequence previously described. In this manner, computer 24 can sample the status of the switches on panels 14 and 16 periodically according to a standard polling technique well known in the computer art and thereby be aware of any changes in one or more of the switch settings.

Such an arrangement allows a single amplifier to be used in computer 24 for the amplification of the signals being picked up by electrodes 28 and thereafter output on pen motors 22. In such a system, each electrode 28 is selected on a time sharing basis for a discrete period of time by the computer 24 through multiplexing input interface 18. For that period of time, the switch settings on the panel 14 associated with the pen motor 22 displaying the signal associated with the particular electrode 28 selected determine the amplification factors and the like applied to the amplifier. The thus amplified signal is then output by computer 24 through multiplexing output interface 20 to be directed to the proper pen motor 22 for the electrode 28. During the next time sequence, the same procedure is accomplished for another electrode 28 and its assigned pen motor 22. This sequence repeats itself for all electrodes 28 and their associated pen motors 22 whereby the result is the same as if individual amplifiers were employed for each electrode/pen motor combination in the manner of the prior art.

It is to be understood that while the present invention was developed specifically for operation within such a multiplexing environment wherein a microcomputer is employed for all functions, the present invention could be adapted to a nonmultiplexed EEG system by employing a smaller microcomputer and memory capability such as available in modern "chip" technology. In such case, however, duplicate connections would have to be provided to the switches on panels 14 and 16. One set of connections would be connected to the amplification circuits in the conventional manner. The second set of connections would be necessary to provide the switch position information to the microprocessor for accomplishing the objectives of the present invention. Additionally, in such an alternate embodiment, provision would have to be made to physically disconnect the normal output to the pen motors 22 to allow the insertion of the data output according to the present invention rather than the time sharing approach to be hereinafter described according to the present invention.

The patient identification and preset selected numbers are designations associated with the entire EEG instrument for a given period of time. Therefore, it is preferred that such data be displayed on an output channel of the recorder associated with a total system function. This is conveniently done by employing the time or event marker channel typically provided on an EEG instrument. Such a time or event marker channel is not dedicated to the display of the signal from an electrode detecting the emanations from the brain. Rather, it displays a straight line output with periodic spikes at preselected time intervals or upon the happening of certain "events" to give the operator a time or event point of reference from which to judge the outputs indicated on the balance of the channels.

In addition to the preset identifier and patient identification numbers output on the time or event marker channel as modified Roman numerals in the manner previously described, the present invention includes the displaying of the parameters associated with each individual channel. This is most easily accomplished by overriding the output signal that might otherwise be displayed on the pen motor of each recorder channel for a period of time sufficient to display the indicated data upon the happening of certain preselected events as will be hereinafter discussed in greater detail. The preferred method of accomplishing such a display for two channels is shown with reference to FIG. 6. The same technique, of course, would be applied to each channel if more than two data channels were employed in the EEG instrument as would be the normal case. The items to be displayed are those selected in the preferred embodiment as applied to the instrument developed by the assignee of the present application only and are not meant to be exclusive. Likewise, the particular manner of display is one found to be particularly workable and, therefore, felt to be preferred by the applicants. Other techniques could, of course, be employed within the scope of the present invention.

As can be seen from the two simulated outputs labeled A and B, in the preferred embodiment the indicated data comprises a lead imbalance indication, a calibration indication, indication of the high frequency filter setting, indication of the time constant chosen, indication of the status of the 30 Hz and 60 Hz filters, and an indication of the gain selected. The lead imbalance portion shows the system response to an injected signal. All other indications are made by particular pen deviation from the base or zero lines designated as 30. In the case of the calibration indication, the pen is first deflected in one direction away from base line 30 and then in the opposite direction from base line 30 by the input to the amplifier of a known fixed voltage level. The deflection distance in each direction can then be compared by the operator to the fixed markings (not shown) normally on the recorder paper.

The high frequency filter switch setting is indicated by a series of pulses the number of which indicate the position of the switch. As with the patient identification and preset numbers, it is preferred to delineate the portion of the recorded output line containing data rather than having the data merely superimposed upon the base line 30. As previously stated, such an approach specifically points out the point at which data is to be expected to prevent misinterpretation. Thus, the offset from base line 30 delineated by secondary base line 32 in simulated outputs A and B delineates the high frequency filter switch position data. Within the boundaries thus defined, it is apparent that in output A there is one spike and on output B there are three spikes indicating switch positions 1 and 3, respectively. A similar technique is employed in the indication of the time constant switch. In order to prevent confusion between the high frequency filter indication and the time constant indication, the secondary base line 34 defining the time constant data limitations is created by deflecting the pen to the opposite side of base line 30 from secondary base line 32. Once again, it is apparent that output A has its time constant switch on position 1 as indicated by a single spike and channel B has its time constant switch on the third position as indicated by three spikes.

The 60 Hz filter and 30 Hz filter switches are typically two position switches. That is, the switch is either "on" or "off". It is convenient in such a case to use one spike to indicate the "on" state and two spikes to indicate the "off" state. Since the high frequency filter and time constant displays are made by enclosing the spikes in a "box" as defined by the deflections of the pens to create the base lines 32 and 34, it is convenient to distinguish the 60 Hz and 30 Hz filter positions by employing no "box" in the manner shown. To distinguish between the 30 Hz and the 60 Hz filter data, however, it is still convenient to place the indication for one on one side of the base line 30 and for the other on the opposite side of the base line 30. Thus, from the simulated recorder outputs A and B of FIG. 6, it is apparent that channel A has its 60 and 30 Hz filters off while channel B has its 60 and 30 Hz filters on.

The gain setting associated with the amplifier of each channel is conveniently shown as in FIG. 6 by inserting a fixed level input signal to the channel. The amount of deflection from the base line 30 is, therefore, indicative of the gain setting of the amplifier.

Thus, it can be seen that by employing the foregoing technique, the desired parameter data can be displayed by the conventional pen motor output of each channel in a manner to be readily distinguishable without the danger of confusion between any one piece of data and the rest of the data being output on the channel.

Wherefore, having thus described my invention, I claim:

1. In a signal recording apparatus having at least one switch for signal parameter section with a plurality of discrete positions wherein an electrical signal responsive to each of said discrete positions is detected and applied to a recorder having a galvanometer type pen motor to create a permanent recording on a moving medium, the method of indicating the position of the switch at the time of record making to a later observer of the recorded output comprising the steps of:
    a. detecting the position of the switch;
    b. overriding the output of the detected signal to the pen motor for a period of time; and,
    c. outputting a coded signal to the pen motor during the overriding period of time, said coded signal having at least one character of a character set associated with the switch such that a character represents each switch position, said character set comprising the numerals 1 through 9 represented by modified Roman numerals created by combining a first output pattern on said recording representing a V and a second output pattern on said recording representing a I where 1=I, 2=II, 3=III, 4=IIII, 5=V, 6=VI, 7=VII, 8=VIII and 9=VIIII.

2. The method of claim 1 including the additional step of:
    providing an indication signal to the pen motor during the overriding period of time delineating the time at which the coded signal is being supplied.

3. The method of claim 2 wherein:
    the indication signal is created by providing a first d.c. offset to the pen motor to create a baseline during the time of the coded signal upon which the coded signal is superimposed which is offset from the position of the pen motor with no signal output.

4. The method of claim 3 wherein:
    said d.c. offset is maintained constant during the time the coded signal is output.

5. The method of claim 3 wherein:
    said d.c. offset is alternately applied and removed during the time the coded signal is output to create a filled-in base area on the permanent recording.

6. The method of claim 5 wherein:
    a. the V's are created by alternately applying and removing a second d.c. offset in conjunction with said first d.c. offset for a period of time, then alternately applying and removing a third d.c. offset in conjunction with said first and second d.c. offsets for a period of time, then alternately applying and removing said second d.c. offset in conjunction with said first d.c. offset for a period of time; and
    b. the I's are created by alternately applying said second and third d.c. offsets in conjunction with said first d.c. offset for a period of time.

7. The method of claim 1 wherein the character set additionally comprises the numeral 0 represented by a base area with no additional data superimposed thereon and the creating of the V's and I's is further accomplished by the steps of:
    a. dividing the time of the coded signal into a plurality of time periods;
    b. storing the total d.c. offset required to be output alternately to the pen motor during each time period to create each of the numerals 1 through 9 superimposed on the base area;
    c. selecting the preferred sequence of values associated with the position of the switch; and,
    d. using said selected prestored sequence to determine the d.c. offset output to the pen motor during each time period whereby the numeral associated with the switch position is created on the permanent recording.

8. In signal recording apparatus having at least one switch for controlling a function of the signal recording apparatus with a plurality of discrete positions and wherein an electrical signal is applied at the input of the signal recording apparatus, amplified, and applied to a galvanometer type pen motor to create a permanent record in a moving medium, the improvement for indicating the position of the switch at the time of recording to a later observer of the recorded output, said improvement comprising:
    a. means for sensing the position of the switch;
    b. means connected to said sensing means for detecting a change in the position of the switch;
    c. means connected to said sensing means and detecting means for overriding the output of the amplified electrical signal to the pen motor and for applying a coded signal to the pen motor during the overriding period which coded signal is indicative of the switch position, said overriding and coded signal output means being adapted to override and apply the coded signal in response to a change in the switch position and includes memory means wherein the numerals 0–9 are defined as a series of d.c. output levels to be applied to the pen motor in sequence during consecutive time periods to cause said coded signal to the pen motor to produce a modified Roman numeral character set combining a first output pattern representing a V and a second output pattern representing a I where 1=I, 2=II, 3=III, 4=IIII, 5=V, 6=VI, 7=VII, 8=VIII, and 9=VIIII, and logic means for selecting the series of d.c. output levels of the numeral representing the switch position and for applying said defined d.c. output levels in sequence to the pen motor.

9. The apparatus of claim 8 and additionally comprising:
means connected to said overriding and coded signal output means for causing said overriding and coded signal output to occur upon the happening of an event other than the changing of the position of the switch.

10. The apparatus of claim 8 wherein:
said logic means includes means alternately applying and removing said d.c. output levels whereby a filled-in character is created on the recorded output.

11. In an electroencephalograph having a plurality of electrodes for attachment to a patient to detect electrical signals from the patient, a recorder having a plurality of galvanometer type pen motors adapted to provide a permanent record on a moving recording medium in response to received signals, amplifier means for amplifying low level electrical signals detected by the electrodes to a level which will drive the pen motors including parameter setting switches for selecting various parameters associated with the amplification applied to the signal to each pen motor, and switch means for connecting the amplifier means between selected ones of the electrodes and selected ones of the pen motors including combination selecting switches for selecting preselected combination assignments of electrodes to pen motors, the improvement comprising:
a. means for sensing the position of the parameter setting and the combination selecting switches;
b. means connected to said sensing means for detecting a change in the position of any one of said switches; and
c. means connected to said sensing means and detecting means for overriding the output of the amplified electrical signal to each pen motor and for applying a coded signal to each pen motor during the overriding period which coded signal is indicative of the switch position of said parameter setting switches associated with that pen motor and for applying a coded signal to one of the pen motors which is indicative of the switch position of said combination selecting switch, said overriding and coded signal output means being adapted to override and apply the coded signal in response to a change in the position of one of said parameter setting and said combination selecting switches and includes memory means wherein the numerals 0–9 are defined as a series of d.c. output levels to be applied to the pen motor in sequence during consecutive time periods to cause said coded signal to the pen motor assigned to display the position of said preselected combination selecting switch to produce a modified Roman numeral character set combining a first output pattern representing a V and a second output pattern representing a I where 1=I, 2=II, 3=III, 4=IIII, 5=V, 6=VI, 7=VII, 8=VIII, and 9=VIIII, and first logic means for selecting the series of d.c. output levels of the numerals representing said preselected combination selecting switch position and for applying said defined d.c. output levels in sequence to the pen motor.

12. The improvement in an electroencephalograph claimed in claim 11 and additionally comprising:
means connected to said overriding and coded signal output means for causing said overriding and coded signal output to occur upon the happening of an event other than the changing of the position of one of said combination selecting and parameter setting switches.

13. The improvement in an electroencephalograph claimed in claim 17 and additionally comprising:
a. switch means connected to said switch position sensing means and said detecting means for selecting a patient identification number combination; and,
b. second logic means included within said overriding and coded signal output means for selecting a series of d.c. output levels of the numerals representing said patient identification switch means position and for applying said defined d.c. output levels in sequence to one of the pen motors.

14. The apparatus of claim 11 wherein:
said logic means includes means for alternately applying and removing said d.c. output levels whereby filled-in characters are created on the recorded output for the modified Roman numeral characters.

* * * * *